(12) United States Patent
Tokuda et al.

(10) Patent No.: US 6,390,442 B2
(45) Date of Patent: May 21, 2002

(54) TWO-PORT VALVE

(75) Inventors: Tetsuro Tokuda; Toyonobu Sakurai; Hiroaki Suzuki, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/739,780

(22) Filed: Dec. 20, 2000

(30) Foreign Application Priority Data

Jan. 6, 2000 (JP) ........................................ 2000-000876

(51) Int. Cl.$^7$ ......................... F16K 31/12; F16K 31/143
(52) U.S. Cl. ......................... 251/63.5; 251/28; 251/357
(58) Field of Search ........................... 251/63.5, 28, 63, 251/62, 63.4, 63.6, 357

(56) References Cited

U.S. PATENT DOCUMENTS

| | | | | |
|---|---|---|---|---|
| 1,316,539 A | * | 9/1919 | Ford ........................... | 251/363 |
| 2,687,273 A | * | 8/1954 | Starkey ....................... | 137/85 |
| 2,720,219 A | * | 10/1955 | Grove et al. ............ | 137/630.19 |
| 2,731,036 A | * | 1/1956 | Hughes .................. | 137/625.34 |
| 2,886,283 A | * | 5/1959 | Natho ......................... | 251/175 |
| 2,985,424 A | * | 5/1961 | Anderson et al. ............ | 251/332 |
| 4,237,920 A | * | 12/1980 | Norman ................... | 137/243.3 |
| 4,257,442 A | * | 3/1981 | Claycomb ................... | 137/238 |
| 4,355,784 A | * | 10/1982 | Cain ...................... | 137/329.01 |
| 4,634,099 A | * | 1/1987 | Danko et al. ............... | 251/214 |
| 5,007,328 A | * | 4/1991 | Otteman .................... | 251/63.5 |
| 5,131,627 A | * | 7/1992 | Kolenc ....................... | 251/331 |

OTHER PUBLICATIONS

U.S. application No. 09/737,582, filed Dec. 18, 2000, pending.
U.S. application No. 09/739,205, filed Dec. 19, 2000, pending.
U.S. application No. 09/739,780, filed Dec. 20, 2000, pending.

* cited by examiner

Primary Examiner—Philippe Derakshani
Assistant Examiner—D. Austin Bonderer
(74) Attorney, Agent, or Firm—Oblon, Spivak, McClelland, Maier & Neustadt, P.C.

(57) ABSTRACT

There is provided a two-port valve in which a deviation of a degree of parallelization of a valve member and a valve seat can be corrected automatically, which has excellent airtightness, and in which assembly and replacement of the valve member are easy. For this purpose, a shoulder portion 51 and a small-diameter portion 52 are formed in a vicinity of an end portion of a shaft 15, a groove portion 55 into which a snap ring 54 is mounted is formed in a vicinity of a tip end portion of the small-diameter portion, a through hole into which the small-diameter portion 52 is inserted and an annular stepped portion formed by increasing a diameter of a portion of the through hole are provided to the valve member 25, a sealant 65 for providing sealing between the shaft and the valve member is mounted to the stepped portion, a plate 66 is provided between the valve member 25 and the snap ring 54, and the valve member 25 is locked while pressing the sealant 65 mounted to the stepped portion and while being pushed against the shoulder portion 51 by the snap ring 54 mounted into the groove portion 55 and the plate 66.

5 Claims, 3 Drawing Sheets

TWO-PORT VALVE

TECHNICAL FIELD

The present invention relates to a two-port valve for allowing and intercepting passage of fluid such as air, oil, water, and steam.

PRIOR ART

There is a known pilot-type two-port valve in which a pilot valve is switched to supply or discharge pressure fluid to and from a pressure operating chamber on one face side of a pressure-receiving body such as a piston and a diaphragm to move up and down the pressure-receiving body and a valve member connected to the pressure-receiving body through a valve stem to open and close a valve seat, thereby connecting and separating an input port and an output port for the pressure fluid to and from each other by opening and closing of the valve seat.

A known pilot-type two-port valve 100 shown in FIG. 4 as an example includes a main valve 101 having an input chamber 103 into which pressure fluid is introduced from an input port, an output port 104, a valve seat 105 in a flow path connecting the ports, and a valve member 106 for opening and closing the valve seat 105 and a pilot valve 102. In the main valve 101, the valve seat 105 is opened and closed by moving the valve member 106 up and down through a valve stem 107. A pressure-receiving body (a diaphragm in this example) 108 is secured to the valve stem 107 and the valve stem 107 is constantly pushed in a valve-closing direction by a return spring 109. The pressure-receiving body 108 is moved up and down by supplying and discharging the pressure fluid to and from the pressure operating chamber 110 by the pilot valve 102.

In the above known pilot-type two-port valve 100, a first stepped portion 114 and a second stepped portion 115 formed of shoulder portions and small-diameter portions extending in an axial direction are formed at a lower portion of the valve stem 107, an external thread is formed at an outer periphery of the small-diameter portion of the second stepped portion 115, the valve member 106 and a receiving plate 116 are respectively fitted over the small-diameter portions of the first stepped portion 114 and the second stepped portion 115, the valve member 106 is pushed against the shoulder portion of the first stepped portion 114 through the receiving plate 116 to mount the valve member 106 to the valve stem 107 by screwing a nut 117 over the small-diameter portion of the second stepped portion 115.

However, in this type of pilot-type two-port valve 100, because the valve member 106 is pushed against the valve stem 107 through the receiving plate 116 by screwing the nut 117 in mounting the valve member 106 to the valve stem 107, there are the following problems (1) to (4).

A two-port valve that is not the pilot type essentially has the similar problems.

(1) Because the valve member is fixed to the valve stem through the nut, it is difficult to obtain a satisfactory degree of parallelization of the valve member and the valve seat and airtightness is poor.

(2) Because it is necessary to screw the nut while fixing the valve stem, assembly is not easy and replacement of the valve member is not easy either.

(3) Because it is necessary to take measures against loosening of the nut and an assembly property and reliability are poor.

(4) It is necessary to subject the valve stem to thread cutting and rotation preventing processing and cost increases.

DISCLOSURE OF THE INVENTION

It is an object of the present invention to provide a two-port valve in which a deviation of a degree of parallelization of a valve member and a valve seat can be corrected automatically, which has excellent airtightness, in which assembly and replacement of the valve member are easy, which has excellent assembly property and reliability, and in which cost can be reduced.

To achieve the above object, a two-port valve of the invention comprises a valve body including an input port and an output port for pressure fluid, a valve seat in a flow path connecting the ports, and a valve member for opening and closing the valve seat, wherein a shaft for driving the valve member for opening and closing has at its tip end portion a shoulder portion, a small-diameter portion extending in an axial direction from the shoulder portion, and a groove portion which is formed in a vicinity of a tip end portion of the small-diameter portion and into which a snap ring is mounted, the valve member has a through hole into which the small-diameter portion of the shaft is inserted and an annular stepped portion formed by increasing a diameter of a portion of the through hole, and the stepped portion being mounted with a sealant for providing sealing between the shaft and the valve member, and the valve member is locked while being pushed against the shoulder portion by the snap ring mounted into the groove portion through the plate.

In the two-port valve of the invention, it is preferable that the stepped portion formed in the through hole of the valve member is formed by increasing the diameter of the through hole on a tip end side of the shaft and that the valve member is pushed against the shoulder portion through the sealant mounted to the stepped portion by the plate or that the shoulder portion of the shaft is tapered and a portion of the valve member pushed against the shoulder portion has a taper that is substantially similar to a taper of the shoulder portion.

The two-port valve may be a pilot-type two-port valve for driving a valve member with pilot fluid pressure, the valve member is connected to a piston driven for opening and closing of the valve seat through a shaft, and a pressure operating chamber to and from which the pilot fluid pressure is supplied and discharged is formed on one side face of the piston.

In mounting of the valve member and the shaft to each other in the two-port valve, the valve member is fitted over the small-diameter portion formed on the shaft, the sealant is mounted to the stepped portion of the valve member, and the plate fitted over the small-diameter portion pushes the valve member through the sealant to resiliently push the valve member against the shoulder portion of the shaft. In this state, a diameter of the snap ring is increased, the snap ring is fitted over the small-diameter portion, and the diameter of the snap ring is reduced in a position of the groove portion formed at the small-diameter portion to mount the snap ring into the groove portion.

Therefore, the valve member is locked by the snap ring mounted into the groove portion of the shaft in a state in which the plate presses the sealant against resilience of the sealant and pushes the valve member against the shoulder portion of the shaft.

By carrying out the operations in a reverse order, the valve member can be detached from the shaft.

As described above, because the valve member is not fixed to the shaft but is locked resiliently by the snap ring through the plate in the two-port valve of the invention, the valve member can be seated along the valve seat, a deviation of a degree of parallelization of the valve member can be corrected automatically, and the shaft is unnecessary to be subjected to thread cutting and rotation preventing processing of a nut.

The plate is locked by the snap ring, which provides measures against loosening. Because sealing is provided between the shaft and the valve member by the sealant mounted to the stepped portion of the valve member, sealing is reliable.

DETAILED DESCRIPTION

Figure 1:
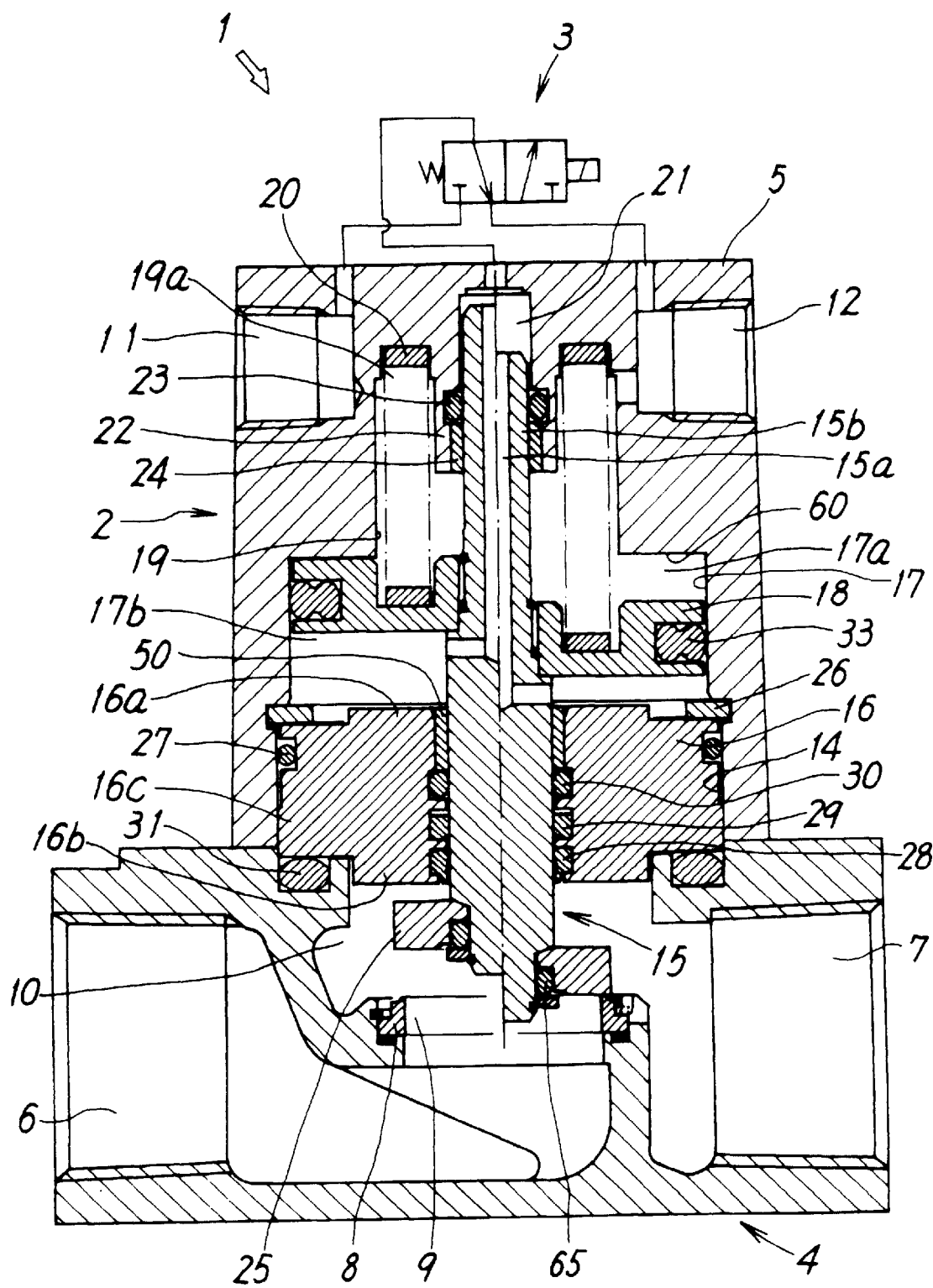
FIG. 1 is a vertical sectional view of an essential portion of an embodiment of the present invention.

FIG. 1 is a vertical sectional view of an essential portion of an embodiment in which the present invention is applied to a pilot-type two-port valve. A valve member on a left side of a center line is in an open state while a valve member on a right side of the center line is in a closed state.

The pilot-type two-port valve 1 includes a main valve (two-port valve) 2 and a pilot valve 3 mounted to the main valve 2. The main valve 2 has a valve body 4, a cover 5 airtightly mounted to the valve body 4, a piston 18 for sliding in the cover 5, and a valve member 25 mounted to a shaft 15 of the piston 18. The valve body 4 has an input port 6 and an output port 7 for pressure fluid, a valve seat 8 provided in a flow path connecting the ports, a mounting portion 9 to which the valve seat 8 is mounted, and an opening 10 provided to open into the cover 5 in a position facing the mounting portion 9, and the valve member 25 for opening and closing the valve seat 8 is mounted in a flow path of the valve body. The cover 5 has a space portion 17 for housing the piston 18 and the shaft 15 and a pilot port 11 and a breathing port 12 are provided to a vicinity of an upper portion of the cover 5.

A lower portion of the space portion 17 formed in the cover 5 opens into the opening 10 of the valve body 4 and a spacer 16 having a through hole through which the shaft 15 passes is housed airtightly in a mouth portion 14 on the open side.

The piston 18 secured airtightly to the shaft 15 is housed in the space portion 17 above the spacer 16. An outer peripheral wall of the space portion 17 functions as a cylindrical face on which the piston 18 slides airtightly. A spring chamber 17a is formed above the piston 18 and a pressure operating chamber 17b is formed between the piston 18 and an upper face of the spacer 16.

A circular ceiling portion 60 having a depression 19 at a center of the ceiling portion 60 is formed above the space portion 17. The ceiling portion 60 limits an upward movement position of the piston 18 and a partition 22 in a shape of a hollow cylinder is formed to project from an upper portion of the depression 19. A space portion 21 in the partition 22 is a space portion into which an extending portion 15b of the shaft 15 is fitted and inserted and a bearing 24 for guiding the shaft 15 and a sealant 23 for sealing a periphery of the shaft 15 are provided to the partition 22 at an outer periphery of the space portion 21.

An annular space portion 19a is formed between the partition 22 and an outer peripheral wall of the depression 19 and a return spring 20 for acting on and constantly biasing the piston 18 downward is housed in the depression 19 including the annular space portion 19a.

The spacer 16 is in a cylindrical shape having small-diameter portions 16a and 16b in vicinities of upper and lower end portions of the cylinder, a large-diameter portion 16c between the small-diameter portions 16a and 16b, and a through hole in a central portion of the cylinder. The lower small-diameter portion 16b is inserted into the opening 10 of the valve body. A lower end face of the large-diameter portion 16c is supported by a body wall at a periphery of the opening 10 and sealed by a sealant 31 mounted in an annular groove on the body wall provided to surround the opening 10. An upper end face of the large-diameter portion 16c is positioned by a snap ring 26 mounted in an annular groove portion in an upper portion of the mouth portion 14. An annular groove in which a sealant 27 is to be mounted is formed in an outer peripheral face of an upper portion of the large-diameter portion 16c. On the other hand, a bearing 50 for guiding the shaft 15 is mounted in a vicinity of an upper end of a peripheral wall of the through hole of the spacer 16 through which the shaft 15 passes. Annular grooves in which sealants 28, 29, and 30 are to be mounted are respectively formed between a lower end of the peripheral wall of the through hole and the bearing 50 and the annular sealants 28, 29, and 30 are respectively mounted in the respective annular grooves.

The sealant 27 is a sealant for separating the pressure operating chamber 17b and outside air from each other. The sealant 28 is a sealant (scraper) for scraping off filth and the like deposited on the shaft. The sealant 29 is a sealant for preventing entry of fluid from the valve body side. The sealant 30 is a sealant for sealing pressure in the pressure operating chamber 17b.

The shaft 15 has a smaller diameter on an upper side of a portion where the piston 18 is mounted than at a portion where the shaft 15 passes through the spacer 16. An upper portion of the shaft 15 is housed in the space portion 21 and a lower portion of the shaft 15 passing through the spacer 16 and extending into the valve body 4 has a reduced diameter and is airtightly mounted with the valve member 25 for opening and closing the valve seat 8 through a sealant 34.

Piston packing 33 is mounted to a periphery of the piston 18, the spring chamber 17a above the piston 18 communicates with the breathing port 12, and the pressure operating chamber 17b communicates with the space portion 21 through a through hole 15a formed in the shaft 15. If the pilot valve 3 is mounted onto the cover 5, the space portion 21 communicates with the pilot port 11 or the breathing port 12 through the pilot valve 3 as shown in FIG. 1.

If the space portion 21 is separated from the breathing port 12 and communicates with the pilot port 11 simultaneously by switching of the pilot valve 3, pressure fluid from the pilot port 11 is supplied to the pressure operating chamber 17b through the through hole 15a. Therefore, the piston 18 is pushed up by the pressure fluid against spring force of the return spring 20. As a result, the valve member 25 moves upward through the shaft 15 to which the piston 18 is secured. Thus, the valve seat 8 opens and the pressure fluid in the input port 6 flows into the output port 7.

On the other hand, if the space portion 21 is separated from the pilot port 11 and communicates with the breathing port 12 by switching of the pilot valve 3, the pressure fluid in the pressure operating chamber 17b flows out from the breathing port 12 through the through hole 15a and the space portion 21. Therefore, the piston 18 is pushed down by the spring force of the return spring 20. As a result, the valve member 25 moves downward through the shaft 15 to which the piston 18 is secured. Thus, the valve seat 8 closes and the pressure fluid in the input port does not flow into the output port.

Although the space portion 21 is connected to the pilot port 11 or the breathing port 12 by providing the pilot valve 3 onto the cover 5 in the embodiment, the pilot-type two-port valve is not necessarily limited to this.

For example, it is also possible to introduce pilot fluid pressure into the pilot port 11 from outside through a three-port valve (not shown). In this case, the pilot port 11 merely has to be connected to the space portion 21 and the pilot valve 3 shown in FIG. 1 may be omitted. Because the pressure fluid in the space portion 21 is supplied and discharged by switching the tree-port valve in this case, it is unnecessary to connect the space portion 21 to the breathing port 12.

Figure 2:
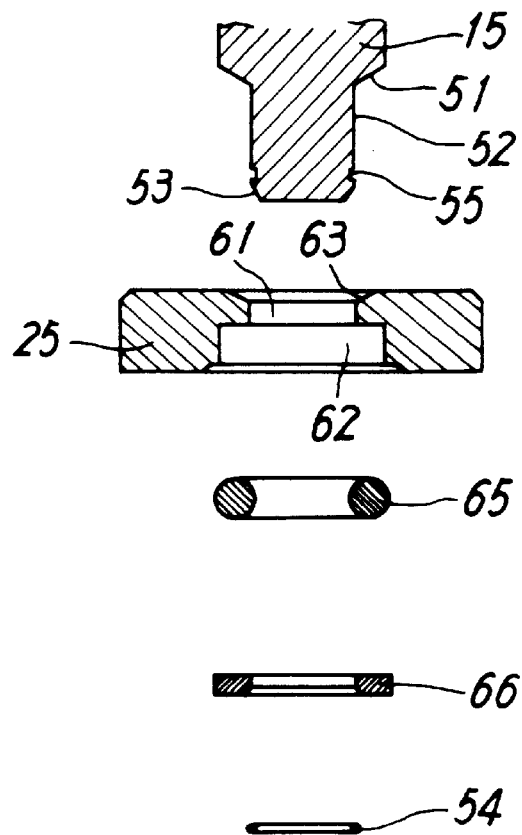
FIG. 2 is an exploded view of a valve member of the present invention.
Figure 3:
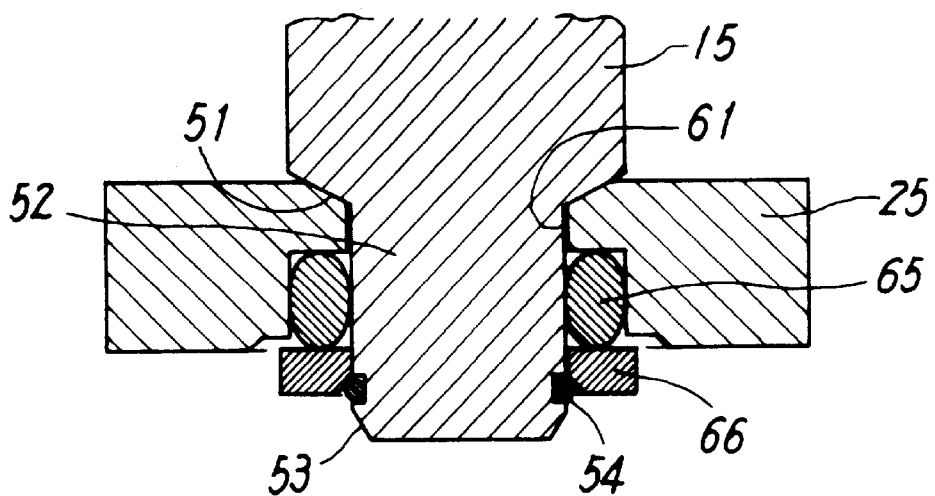
FIG. 3 is an enlarged sectional view of the valve member of the invention after assembly.
Figure 4:
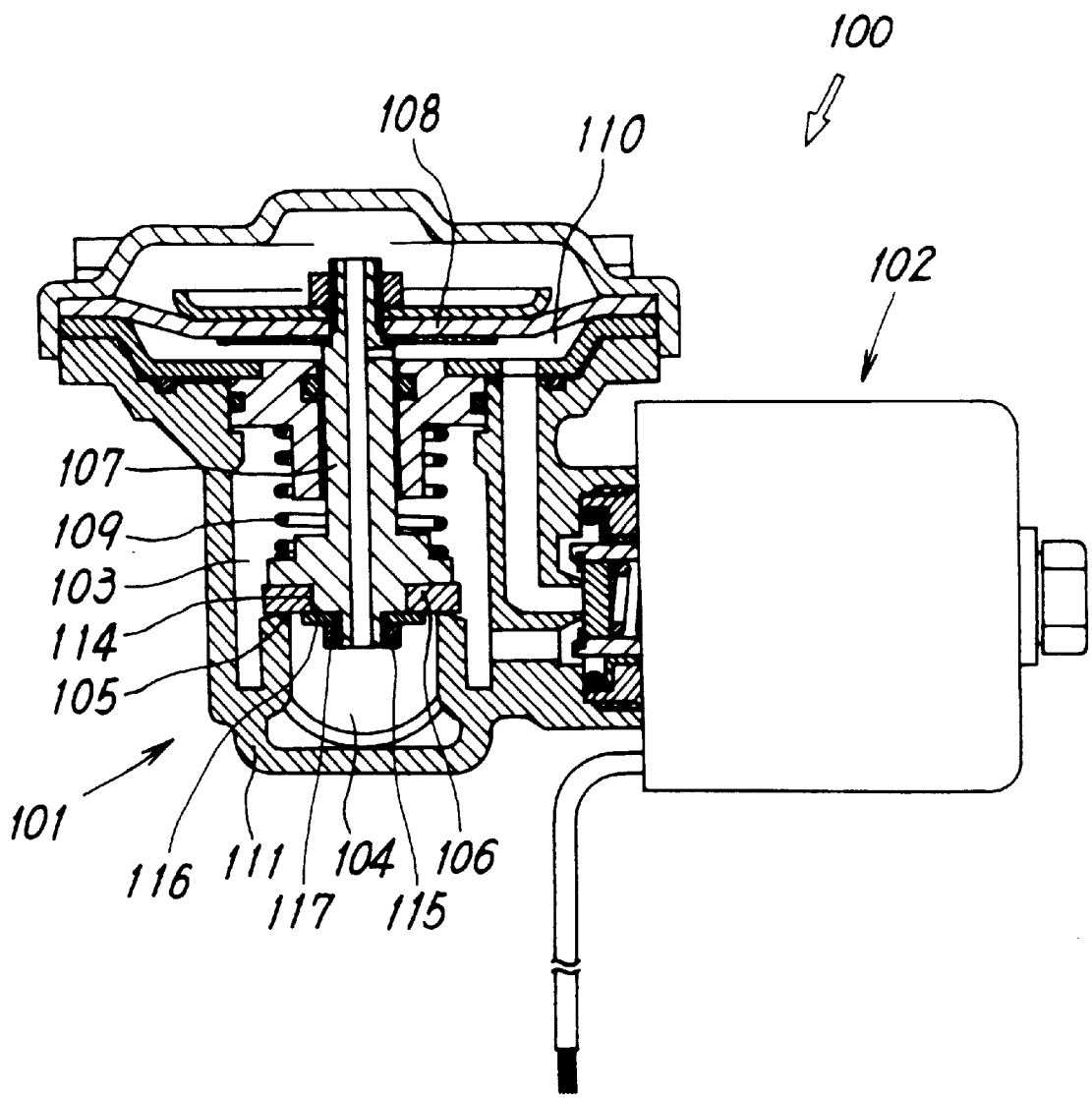
FIG. 4 is a vertical sectional view of an essential portion of a known pilot-type two-port valve.

FIGS. 2 and 3 show details of a connecting structure of the shaft 15 and the valve member 25. FIG. 2 is an exploded view of the valve member and FIG. 3 is an enlarged sectional view of the valve member after assembly.

The shaft 15 has in a vicinity of a tip end portion thereof a tapered (saucer-shaped) shoulder portion 51 with a diameter gradually reducing toward the tip end and with a large taper angle and a small-diameter portion 52 extending from a position of the shoulder portion toward the axial tip end. A taper 53 is formed at a tip end portion of the small-diameter portion 52 and a groove portion 55 which is adjacent to the taper 53 and into which a snap ring 54 is mounted is formed above the taper 53.

The valve member 25 is in a disc shape and has a through hole 61 into which the small-diameter portion 52 of the shaft 15 is inserted at a center portion of the valve member 25. A diameter of one end portion of the through hole 61 on the tip end side of the shaft 15 is partially increased to form an annular stepped portion 62 and the other end of the through hole 61 is formed with a tapered portion 63 whose diameter is increased to have a taper substantially similar to that of the shoulder portion 51.

A sealant 65 for providing sealing between the small-diameter portion 52 of the shaft 15 and the valve member 25 is mounted to the stepped portion 62. The valve member 25 is locked through a plate 66 having a through hole into which the small-diameter portion 52 of the shaft 15 is inserted while being pushed against the shoulder portion 51 by the snap ring 54 mounted into the groove portion 55. An annular sealant 65 formed of a resilient member has a size in an axial direction of the shaft larger than a depth of the stepped portion 62 when the sealant 65 is mounted to the stepped portion 62 as shown in FIG. 3. Therefore, when the plate 66 is mounted by the snap ring 54 mounted into the groove portion 55, the valve member 25 is resiliently pushed against the shoulder portion 51 through the sealant 65 by the plate 66. The snap ring 54 is formed by curving a resilient metal wire into a C shape.

Assembly of the valve member 25 is carried out as follows.

In mounting the valve member 25 to the shaft 15, the valve member 25 is fitted over the small-diameter portion 52 formed in a vicinity of an end portion of the shaft 15 and the sealant 65 is mounted to the annular stepped portion 62.

Then, the plate 66 is fitted over the small-diameter portion 52 and the tapered portion 63 of the valve member 25 is pushed against the tapered shoulder portion 51 of the shaft 15 by pushing the sealant 65 and the valve member 25 by the plate 66. In this state, a diameter of the snap ring 54 is increased and the snap ring 54 is fitted over the shaft 15. By reducing the diameter of the snap ring 54 in a position of the groove portion 55 provided to the small-diameter portion 52, the snap ring 54 is mounted into the groove portion 55.

Therefore, the valve member 25 is locked to the shaft 15 through the plate 66 by the snap ring 54 mounted into the groove portion 55 of the shaft 15 in a state in which the plate 66 pushes the tapered portion 63 of the valve member 25 against the tapered shoulder portion 51 of the shaft 15 while pushing the sealant 65 against resiliency of the sealant 65.

Thus, the valve member 25 is mounted to the shaft 15. By carrying out the operations in a reverse order, the valve member 25 can be detached from the shaft 15.

Because the valve member 25 is not fixed to the shaft 15 through a nut or the like but is locked by the snap ring 54 through the plate 66 in this pilot-type two-port valve, the valve member 25 can be seated along the valve seat 8, a deviation of a degree of parallelization of the valve member 25 can be corrected automatically, and the shaft is unnecessary to be subjected to thread cutting and a rotation preventing processing of a nut.

The plate 66 is locked by the snap ring 54, which provides measures against loosening. Therefore, the shaft is unnecessary to be subjected to the thread cutting and the rotation preventing processing of the nut, assembly and replacement of the valve member are easy, an assembly property and reliability are enhanced, and cost reduces.

Because sealing is provided between the shaft 15 and the valve member 25 by the sealant 65 mounted to the stepped portion 62 of the valve member 25, sealing is reliable.

As described above, according to the invention, it is possible to provide a two-port valve in which the deviation of the degree of parallelization of the valve member and the valve seat can be corrected automatically, which has an excellent sealing property, in which assembly and replacement of the valve member are easy, which has excellent assembly property and reliability, and the cost of which can be reduced.

What is claimed is:

1. A two-port valve comprising a valve body including an input port and an output port for pressure fluid, a valve seat in a flow path connecting said ports, a valve member for opening and closing said valve seat, and a shaft for causing said valve member to carry out opening and closing operations, wherein said shaft has at a tip end portion thereof a shoulder portion, a small-diameter portion extending forward in an axial direction from a position of said shoulder portion, and a groove portion which is formed in a vicinity of a tip end portion of said small-diameter portion and into which a snap ring is mounted, said valve member has a through hole into which said small-diameter portion of said shaft is inserted and an annular stepped portion formed by increasing a diameter of a portion of said through hole, said stepped portion housing a sealant for providing sealing between said valve member and said shaft, and said valve member and an annular plate are successively fitted over said small-diameter portion of said shaft and said plate is fixed to said shaft by said snap ring mounted into said groove portion so as to mount said valve member to said shaft in a state in which said valve member is pushed against said shoulder portion.

2. A two-port valve according to claim 1, wherein said stepped portion formed in said through hole of said valve member is formed by increasing said diameter of an end portion of said through hole on a tip end side of said shaft and said valve member is pushed against said shoulder portion through said sealant by bringing said plate into pressure contact with said sealant housed in said stepped portion.

3. A two-port valve according to claim 2, wherein said shoulder portion of said shaft has a tapered shape and a portion of said valve member pushed against said shoulder portion has a taper that is substantially similar to a taper of said shoulder portion.

4. A two-port valve according to claim 1, wherein said shoulder portion of said shaft has a tapered shape and a portion of said valve member pushed against said shoulder portion has a taper that is substantially similar to a taper of said shoulder portion.

5. A two-port valve according to claim 1, wherein said two-port valve is a pilot-type two-port valve for driving a valve member with pilot fluid pressure, said valve member is connected to a piston driven for opening and closing of said valve seat through a shaft, and a pressure operating chamber to and from which said pilot fluid pressure is supplied and discharged is formed on one side face of said piston.

* * * * *